Dec. 24, 1946.     J. F. O'BRIEN     2,413,032
ELECTRICITY CONDUCTOR UNIT
Filed Jan. 30, 1942
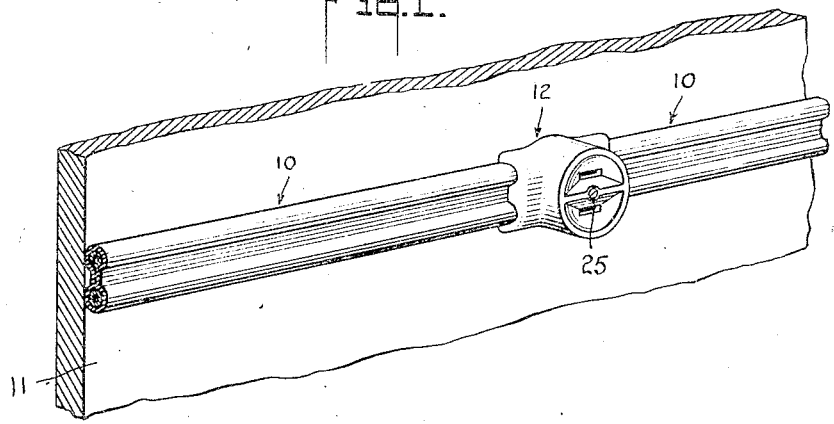
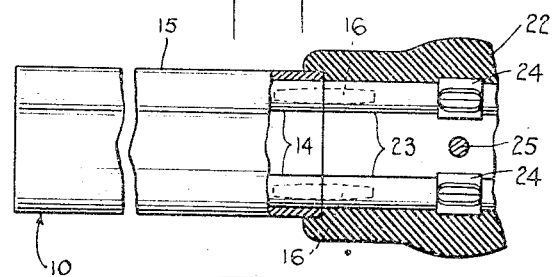
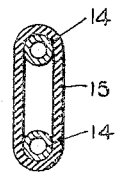
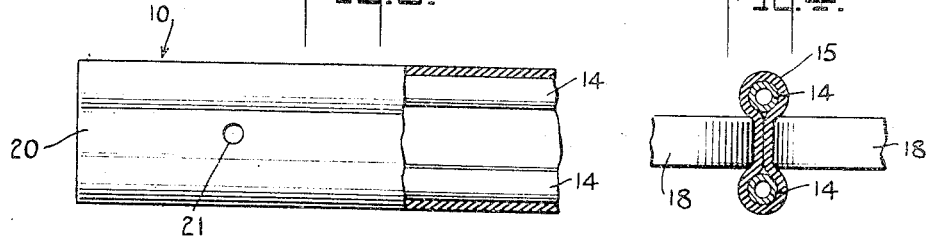
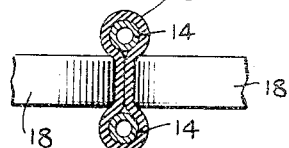
INVENTOR
Joseph F. O'Brien
HIS ATTORNEY Patented Dec. 24, 1946

2,413,032

UNITED STATES PATENT OFFICE 2,413,032

ELECTRICITY CONDUCTOR UNIT

Joseph F. O'Brien, Jersey City, N. J., assignor to John B. Pierce Foundation, New York, N. Y., a corporation of New York Application January 30, 1942, Serial No. 428,808

5 Claims. (Cl. 174—117)

This invention relates to electrical wiring systems, and in particular to an improved electricity conductor unit therefor.

It is an object of the invention to provide an electricity conductor unit of simple and inexpensive construction, having a hard, scuff-proof outer sheath, and adapted for mounting on a wall or other exposed location.

It is a further object of the invention to provide an electricity conductor unit affording facilities for the insertion of outlets in a wiring system at desired locations.

According to a preferred form of the invention, my improved electrical conductor unit embodies electrical conductors insulatedly mounted in substantially uniform spaced relationship within an insulating casing formed from vulcanized fiber or like hard material.

Said outer sheathing may be initially of oval shape, within which, at the respective lateral margins thereof, are positioned electricity conductors. Following the insertion of the conductors as aforesaid, the assembly may be run between suitable rolls or dies, having a width less than the width between the conductors, to form the wall of such outer housing about the conductors. The resulting conductor unit has a dumbbell configuration in cross section, the central web portion serving as an insulating barrier between the conductors, maintaining the same in proper spaced relationship.

Other features and advantages of the invention will hereinafter appear.

In the drawing—

Fig. 1 is a perspective view of a portion of an electric wiring system employing my improved electricity conductor, and illustrating the interconnection of conductor units by means affording outlet facilities;

Fig. 2 is an enlarged elevation, partly in section, showing a form of interconnection between the electricity conductors of the conductor unit and the outlet-provided device of Fig. 1;

Fig. 3 is a transverse sectional view of a seamless form of electricity conductor unit in a preliminary stage of manufacture;

Fig. 4 is a similar transverse sectional view of the construction of Fig. 3, illustrating the operation upon the assembly by rolls or like means for displacing and compressing the central portion of the walls of the seamless tube to form the insulating web intermediate the electrical conductors; and Fig. 5 is an elevational view, partly in section, of the electricity conductor unit after operation by the means shown in Fig. 4.

Referring to the drawing, an improved wiring system embodying the present invention includes conductor units 10, 10, of indeterminate length, mounted on the surface of a wall 11, and mutually interconnected by means including the outlet provided device 12.

Such electricity conductor units 10 include electricity conductors 14, 14 insulatedly mounted within an outer casing or sheathing 15, which is advantageously of vulcanized fiber or like insulating material of suitable surface hardness and rigidity. The material known in the trade as "Vulcoid" has been found satisfactory for the outer sheathing 15.

The electricity conductors 14, 14 may be tubular, as shown in Fig. 2, or of other cross section providing proper conduction of electricity. Tubular conductors are advantageous for the reason that electrically conductive pins 16 or the like may be used for interconnecting adjacent tubular conductors, as indicated in Fig. 2; tubular conductors have a further advantage in that when a conductor unit 10 is to be shortened, the unit may be cut transversely at any location along its length and the tubular conductors are in proper state for electrical connection with conductor units or outlet units without further operation.

As appears in Fig. 3, the conductors 14 may be positioned within a generally ovate seamless tube of "Vulcoid" or like material, said material being, preferably, in a relatively soft, or partially cured, state at this stage of assembly. Following the insertion of conductors 14, the sheath material may be operated upon by relatively narrow rollers 18, 18, see Fig. 4, or drawn between suitable dies, to displace inwardly the wall portions between the conductors 14, thereby forming a web 20 of insulation material between the conductors 14. Concurrently with the operation of the rollers 18 or equivalent, or subsequent thereto, the outer sheath material may be cured to final status, thereby giving to such outer sheath a permanent set and bond of the sides of such sheath and adhesion between the sheath and the conductors.

The units 10 may be provided with openings 21 at suitable intervals, through which screws or nails may be passed to fasten the conductor unit to a wall surface.

Conductor units formed pursuant to this invention are characterized by toughness of outer surface, and substantial structural strength, particularly with respect to sagging or resistance to bending in the plane of the web 20. Screws or the like for securing the units 10 to a wall may, therefore, be widely spaced; and when the outlet units 12 are relatively frequent, the conductor units 10 may be adequately secured by the bodies of the outlet units, which, as shown in Figs. 1 and 2, conform to the contour of the sheath 15.

As appears in Figs. 1 and 2, adjacent sections of conductor units 10 may be interconnected through the agency of an outlet provided unit 12 having a body 22 of insulation material, and suitable conductors 23, 23 mounted therein for registry with the conductors 14, 14 of the conductor units. When tubular conductors are employed, the pins 16 may be frictionally inserted into the adjacent conductors 14, 23, to complete the electrical connection thereof.

Suitable contact devices 24, 24 may be provided on the conductors 23. A screw 25 may pass through the body of unit 12 for securement thereof.

The end walls of unit 12 desirably overhang the end portions of the units 10 and conform to the configuration thereof, to secure the units and prevent exposure of the conductors at the point of interconnection.

Whereas I have described my invention by reference to specific forms thereof, it will be understood that many changes and modifications may be made without departing from the spirit of the invention.

I claim:

1. An insulated electrical conductor strip, comprising a plurality of bare conductors disposed in spaced relation within a seamless casing of rigid insulation material of substantially uniform wall thickness throughout, a portion of said casing wall between the spaced conductors being offset and in fixed juxtaposition with the opposite wall portion to constitute a substantially closed, rigid web for maintaining uniform spaced relationship between the conductors.

2. A method of making an insulated electrical conductor strip, comprising disposing bare conductors in spaced relation within a seamless tubular casing of rigid insulation material, and forcing a portion of the casing wall between the spaced conductors into fixed juxtaposition with its opposite wall portion whereby to form a closed rigid web for maintaining uniform transverse spaced relationship between the conductors.

3. A conductor strip comprising a seamless, initially tubular, elongated sheath of relatively rigid insulating material, at least one wall of which, intermediate its lateral edges, is deformed and deflected into substantial contact with its opposite wall to thereby provide a relatively rigid web and two spaced-apart conduits at the lateral edges thereof, and conductors disposed in said conduits.

4. A conductor strip comprising a seamless, initially tubular, elongated sheath of relatively rigid insulating material, the wall portions intermediate the lateral edges being deformed and deflected into substantial contact to thereby provide a relatively rigid web and two spaced-apart conduits at the lateral edges thereof, and conductors disposed in said conduits.

5. A conductor strip comprising a seamless initially tubular, elongated sheath of vulcanized fiber insulating material, the wall portions intermediate the lateral edges being deformed and deflected into substantial contact to thereby provide a relatively rigid web and two spaced-apart conduits at the lateral edges thereof, and conductors disposed in said conduits.

JOSEPH F. O'BRIEN.